No. 633,856. Patented Sept. 26, 1899.
B. G. LAMME & J. P. MALLETT.
DISTRIBUTED WINDING FOR ELECTRICAL MACHINES.
(Application filed Feb. 6, 1899.)
(No Model.) 2 Sheets—Sheet 1.
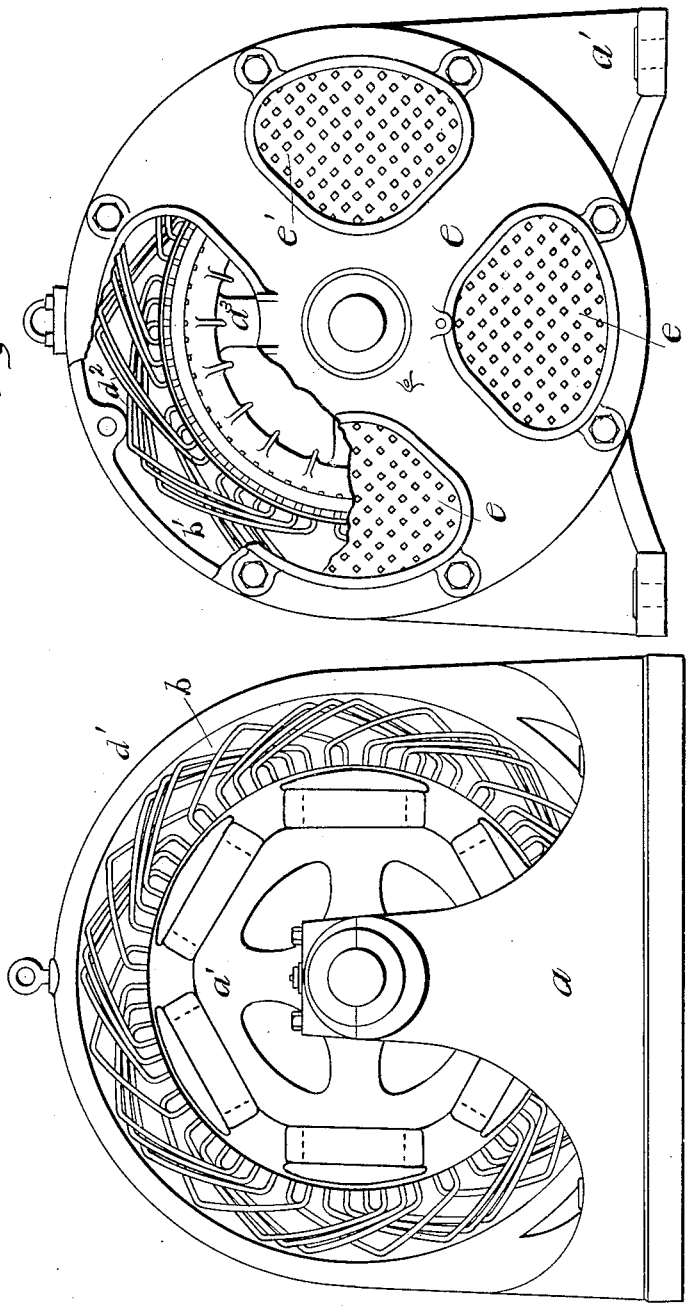

No. 633,856. Patented Sept. 26, 1899.
B. G. LAMME & J. P. MALLETT.
DISTRIBUTED WINDING FOR ELECTRICAL MACHINES.
(Application filed Feb. 6, 1899.)
(No Model.) 2 Sheets—Sheet 2.

UNITED STATES PATENT OFFICE.

BENJAMIN G. LAMME AND JOHN P. MALLETT, OF PITTSBURG, PENNSYLVANIA, ASSIGNORS TO THE WESTINGHOUSE ELECTRIC AND MANUFACTURING COMPANY, OF PENNSYLVANIA.

DISTRIBUTED WINDING FOR ELECTRICAL MACHINES.

SPECIFICATION forming part of Letters Patent No. 633,856, dated September 26, 1899.

Application filed February 6, 1899. Serial No. 704,654. (No model.)

*To all whom it may concern:*

Be it known that we, BENJAMIN G. LAMME and JOHN P. MALLETT, citizens of the United States, residing in Pittsburg, in the county of Allegheny and State of Pennsylvania, have invented a new and useful Improvement in Distributed Windings for Electrical Machines, (Case No. 806,) of which the following is a specification.

Our invention relates to electrical machines, and particularly to the windings of the armatures or primary members of such machines.

The object of our invention is to provide a distributed winding for the armatures of generators, rotary transformers, or synchronous motors or for the primary members of induction-motors which shall be continuous between the two terminals of any given circuit and which shall be easily applied and symmetrical in form and which shall therefore be susceptible of greater economy in construction than the windings heretofore employed.

Our invention was primarily designed for use in the construction of polyphase induction-motors and rotary-field polyphase generators; but it is not limited to these specific types of machines.

In constructing polyphase generators and motors prior to our present invention it was customary to employ end-connectors of one form for the primary member or armature-coils of each group and connectors of a different form for joining the several groups in series. By making all connectors of the same form and length and by arranging them with relation to each other and with relation to the bar-conductors in accordance with our present invention we minimize the cost of labor and materials and reduce the stray field of the machine, and consequently the self-induction in the conductors. We also provide a more perfectly-balanced field, and therefore reduce the tendency to vibration and consequent possibility of disarrangement of the connectors.

Figure 3:
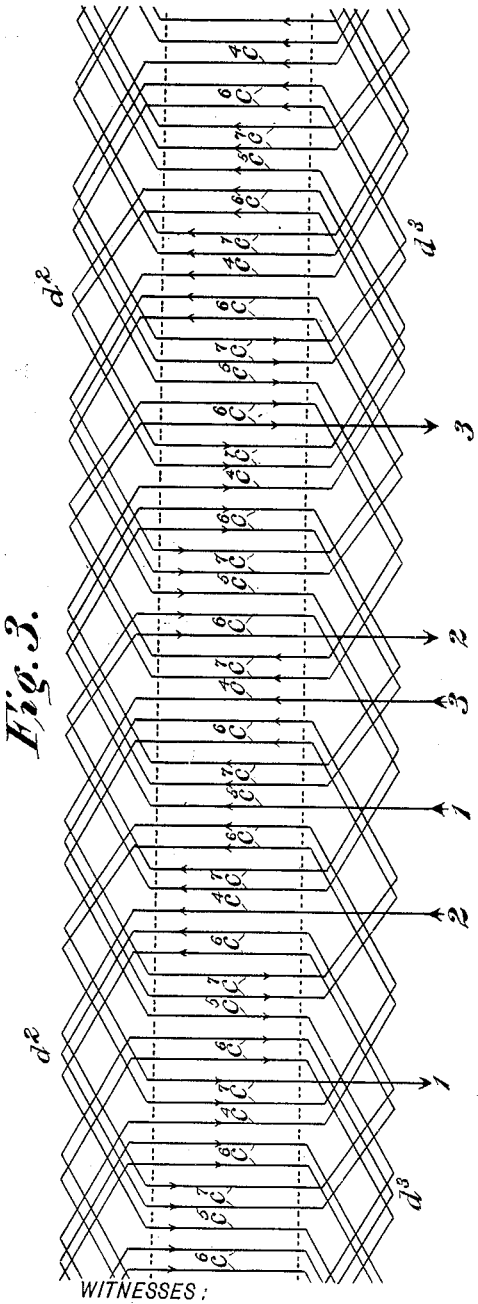
Figure 4:
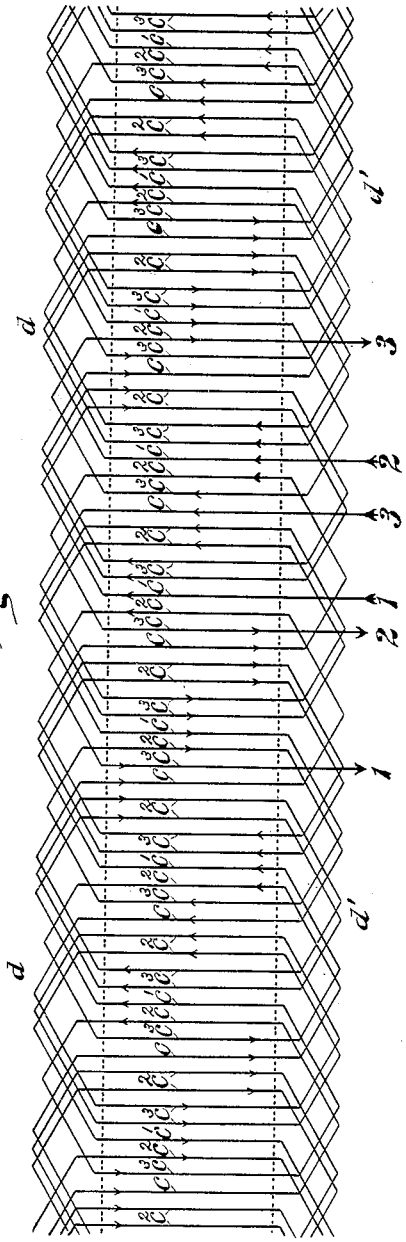

In the accompanying drawings, Figure 1 is an end elevation of a generator having a rotary-field magnet and a stationary armature provided with a three-phase six-pole winding. Fig. 2 is a similar view of a three-phase four-pole induction-motor, a portion of the end plate of the motor being broken away in order to show the winding of the primary member. Fig. 3 is a diagram of the winding of the primary member of the machine shown in Fig. 2, the cylindrical core being indicated as developed into a plane. Fig. 4 is a similar diagram of the winding of the armature of the machine shown in Fig. 1.

Referring now particularly to Figs. 1 and 4, the frame $a$ of the machine supports a rotary-field magnet $a'$, and is provided with a laminated core $b$, having slots or grooves for the armature-coils, as is usual in machines of this class. In the machine shown there are seventy-two of these core slots or grooves; but obviously the number may be greater or less than that shown, if desired. These slots are divided into six groups, thus making twelve slots per pole, there being four conductors of each phase for each pole.

As usually constructed the portions of the armature-conductors located in the slots or grooves of the core are in the form of bars, the ends of these bars being properly connected outside the core by means of end-connectors of suitable form, which are riveted and soldered or bolted or otherwise fastened to the ends of the bars, so as to make good electrical connection therewith.

In the form of winding shown in Figs. 1 and 4 one of the middle bars of each group of four bars corresponding to each phase for each pole projects equally beyond the two ends of the core $b$. These symmetrically-projecting bars are alternately long and short and are designated, respectively, as bars $c$ and bars $c'$. The bars $c^2$ and $c^3$ at the sides of each symmetrically-projecting bar are of intermediate length and project into the plane of the ends of the short bars at one end of the core and into the plane of the ends of the long bars at the other end, the long ends of the bars $c^2$ being at the same end of the core as the short ends of bars $c^3$, and vice versa. Since there is an even number of bars for each phase per pole, the groups have alternately two bars $c^2$ and one bar $c^3$ and one bar $c^2$ and two bars $c^3$. One end of each of the bars $c$ is connected by a connector $d$ to the nearest bar $c^3$ of the same phase and corresponding to the adjacent pole at one side. The other end of each of the bars $c$ is connected by a connector $d'$ to the nearest bar $c^2$ of the same phase and corresponding to the adjacent pole at the other side. The ends of the bars $c'$ are connected in the same manner to the bars $c^2$ and $c^3$, except that the connectors extend to different poles in the two cases.

Except as above indicated the bars $c^2$ are joined by end-connectors $d$ and $d'$ to the bars $c^3$ of the same phase and corresponding to adjacent poles.

The leads 1 1, 2 2, and 3 3 correspond to the three phases of current, and the ends of the bars to which these are connected are for obvious reasons not joined by connectors $d$.

In Fig. 4 we have indicated the core $b$ by broken lines and the several poles and the phases of current producing the same by arrow-heads, those at the top corresponding to phase 1, those at the bottom to phase 2, and those in the middle to phase 3. This system of arrangement of long, short, and intermediate bars and end-connectors is the same throughout the armature, so that, as is seen in Fig. 4, the end-connectors $d'$ are symmetrically grouped, there being two end-connectors in each group. At the other end of the core groups of three alternate with single end-connectors $d$, thus making an arrangement that is as a whole symmetrical, though different from that at the other end of the core.

If the number of slots and bars per pole were greater, but an even number, obviously the grouping would be different from that shown; but it would still remain symmetrical, and each symmetrically-projecting bar would be one of the two middle bars of a group.

Referring now particularly to Figs. 2 and 3, the frame $a'$ of the motor is provided with a laminated core $b'$, the secondary rotating member $a^3$ being constructed with bar-conductors and end rings, as is usual in such machines, and the whole being protected by end plates $e$, of suitable construction, having openings for ventilation provided with perforated plates or gratings $e'$. The core $b'$ of the primary member in this case is shown as provided with sixty slots divided into four groups, thus making fifteen slots per pole and five for each phase per pole, the windings being arranged for three phases of current. There being an odd number of slots and conducting-bars for each group, the middle bars $c^4$ and $c^5$ project symmetrically, the former being long and the latter short, as in the other construction described. In this, as in the other form also, the respective ends of the middle bars $c^4$ and $c^5$ are joined to connectors $d^2$ and $d^3$, that project to the right and to the left at the opposite ends of the core. The two bars $c^6$ for each phase in each group at the left of the middle bar project equally with the bars $c^4$ at one end and equally with the bars $c^5$ at the other end of the core $b'$. The bars $c^7$ also project unequally to the same degree as the bars $c^6$, but their short ends and the long ends of bars $c^6$ are at the same end of the core, and vice versa. Each of the middle bars $c^4$ and $c^5$ is connected at its respective ends to the nearest bars $c^6$ and $c^7$ of the same phase corresponding to adjacent poles, and the remaining side bars $c^6$ are connected to the remaining side bars $c^7$ of the same phase corresponding to adjacent poles, as is clearly shown in Fig. 3 of the drawings. This arrangement affords a continuous winding that is symmetrical, the connectors at both ends of the core being arranged in groups alternating two and three per group, except where the leads 1 1, 2 2, and 3 3 are brought out for connection to the external circuit. The three end-connectors corresponding to these leads are, for obvious reasons, omitted.

The outline of the core and the poles and phases of current are indicated in Fig. 3 the same as in Fig. 4. In fact, the only difference between these windings resides in or is due to the difference in the number of slots per pole.

It will be understood that the leads 1 1, 2 2, and 3 3 brought out for connection to the external circuit may be so connected and combined as to provide either a star or delta type of winding, as may be desired. It will also be understood that this type of winding may be applied to either the stationary or the rotating member of a machine irrespective of whether such machine be a generator or motor or a combination of the two and also that the number of poles, the number of phases, and the number of slots and conductors per pole may be varied as may be found desirable.

While we have made specific reference to a type of winding in which end-connectors are riveted and soldered or otherwise fastened to the conductors that are located in the core-slots, we do not intend to thereby so limit our invention as to exclude windings comprising coils the ends of which are integral with the sides.

We claim as our invention—

1. In an electrical machine, the combination with a slotted core, of a continuous multipolar winding having the middle conductor or one of two middle conductors for each of one or more phases for each pole connected at its respective ends to the nearest side conductors of said phase or phases corresponding to the adjacent poles.

2. In an electrical machine, the combination with a slotted core, of a multipolar, polyphase winding having the respective ends of the middle or next to the middle conductors of the several phases for each pole connected to the nearest side conductors of the same phase pertaining to the adjacent poles.

3. In an electrical machine for producing or receiving polyphase currents, the combination with a slotted core, of a plurality of continuous, multipolar windings, each of which has the respective ends of the middle or next to the middle conductor of each phase for each pole connected to the nearest side conductors of the same phase for the adjacent poles, said middle or next to the middle conductors being alternately long and short.

4. In an electrical machine, the combination with a slotted core, of a multipolar, polyphase bar-winding, the middle or adjacent to the middle bars for the several phases of each pole being alternately long and short, and the remaining bars being of intermediate length.

5. In an electrical machine, the combination with a slotted core, of a multipolar, polyphase, bar-winding, the middle or adjacent to the middle bars for the several phases of each pole being alternately long and short and projecting symmetrically at the core ends, and the remaining bars being of intermediate length and projecting substantially the same distance as the short bars at one end and substantially the same distance as the long bars at the other end of the core.

6. In an electrical machine, the combination with a slotted core, of a multipolar, polyphase, bar-winding, the middle or adjacent to the middle bars for the several phases of each pole being alternately long and short and projecting symmetrically at the core ends, and the remaining bars being of intermediate length and projecting the same distance as the short bars at one end and the same distance as the long bars at the other end, the long projections at one side of the middle or adjacent to the middle bar and the short projections at the other side being at the same end of the core.

7. In an electrical machine, the combination with a slotted core, of a multipolar, polyphase, bar-winding, the middle or adjacent to the middle bar for each phase at each pole being connected at its respective ends to the corresponding ends of the nearest side bars of the same phase for the adjacent poles, and the intermediate bars of the same phase for the adjacent poles being connected together, all of the end-connectors being of substantially the same form and dimensions.

8. In an electrical machine, the combination with a slotted core, of a polyphase winding therefor, comprising bars of three different lengths and end-connectors all of which are of substantially the same length and form and symmetrically arranged to constitute independent continuous circuits equal in number to the phases of current.

9. In an electrical machine, the combination with a slotted core, of a distributed, continuous winding therefor comprising bars of three different lengths and end-connectors all of which are of substantially the same length and form and symmetrically arranged.

In testimony whereof we have hereunto subscribed our names this 3d day of February, 1899.

BENJ. G. LAMME.
JOHN P. MALLETT.

Witnesses:
WESLEY G. CARR,
H. C. TENER.